United States Patent Office 3,806,500
Patented Apr. 23, 1974

3,806,500
POLYMERIZATION WITH THERMALLY
AGED CATALYST
Frederick J. Karol, Somerset, N.J., assignor to Union
Carbide Corporation, New York, N.Y.
No Drawing. Filed July 21, 1972, Ser. No. 273,757
Int. Cl. C08f 1/36, 1/42, 3/06
U.S. Cl. 260—94.9 B      42 Claims

ABSTRACT OF THE DISCLOSURE

Ethylene is homopolymerized, or copolymerized with other alpha olefins, with a catalyst comprising pi-bonded chromium compound supported on inorganic oxide and thermally aged in an inert atmosphere.

The thermal aging of the catalyst changes the melt index and unsaturation characteristics of the polymers made therewith.

BACKGROUND OF THE INVENTION

(1) Field of the invention

The invention relates to the catalytic polymerization of ethylene.

(2) Description of the prior art

Some pi-bonded chromium compounds may be used, unsupported, as olefin polymerization catalysts, as disclosed for example in U.S. 3,379,706. Other unsupported pi-bonded chromium compounds, however are relatively inactive as olefin polymerization catalysts under normal polymerization conditions.

The activity, as olefin polymerization catalysts, of the pi-bonded chromium compounds may be generated or enhanced by using the compounds on inorganic oxide supports, as disclosed for example, in U.S. 3,123,571 and U.S. 3,157,712.

Each of the supported pi-bonded chromium compounds tends to require the use of different polymerization process parameters, and to produce polymers having different characteristics. Some of these supported pi-bonded chromium compounds, for example, tend to be very responsive to hydrogen as a chain transfer agent, whereas others are not so responsive. Some of these supported pi-bonded chromium compounds tend to produce polymers which are highly saturated and have a high melt index while others produce polymers which are relatively unsaturated and have a low melt index. Some of thes supported pi-bonded chromium compounds tend to produce a relatively high degree of isomerization in the resulting polymers, while others have a relatively low effect on isomerization.

It has not been possible, prior to the present invention, to provide a means for standardizing the procedures for using these supported pi-bonded chromium compounds as ethylene polymerization catalysts so as to provide polymers made therewith that had substantially the same properties or characteristics.

SUMMARY OF THE INVENTION

It has now been found that inorganic oxide supported pi-bonded chromium compounds may be used as ethylene polymerization catalysts to produce polymers having substantially the same properties or characteristics if the supported compound is thermally aged in an inert atmosphere prior to its use as an ethylene polymerization catalyst.

An object of the present invention is to provide a means for standardizing the characteristics, as ethylene polymerization catalysts, of inorganic oxide supported pi-bonded chromium compounds, so that polymers having substantially the same properties or characteristics may be made with all such catalysts.

Another object of the present invention is to provide a means for altering the characteristics, or active sites, for ethylene polymerization purposes, of inorganic oxide supported pi-bonded chromium compounds so that all the catalysts may be used in the absence of hydrogen to produce unsaturated polymers having a relatively low melt index.

DESCRIPTION OF THE PREFERRED EMBODIMENT

It has now been found that the characteristics of inorganic oxide supported pi-bonded chromium compounds, as ethylene polymerization catalysts, may be standardized so that all these catalysts may be used in the absence of hydrogen to produce unsaturated polymers having a low melt index by thermally aging the catalysts in an inert atomsphere.

Pi-bonded chromium compounds

The π bonded chromium compounds which are used in the present invention have the structure

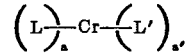

wherein L and L' are the same or different organic ligands which are adapted to being pi-bonded to the chromium atom, and $a$ and $a'$ are each integers of 0 to 3, inclusive, with the proviso that $a+a'=2$ to 6, inclusive.

The chromium atoms in these compounds may have a valence of 0, 2 or 3.

The ligands which may be used in the π bonded chromium compounds include carbonyl radicals and substituted and unsubstituted hydrocarbon radicals.

The unsubstituted hydrocarbon radicals which may be used as ligands in the π bonded chromium compounds may be saturated or unsaturated and would include linear and cyclic aliphatic groups such as allyl, cyclopentadienyl, cyclobutadienyl and cycloheptatrienyl; and aryl groups such as phenyl, benzyl, tolyl, cumyl and naphthyl. These hydrocarbon radicals may also be substituted with substituents which are inert to the other components of the catalyst and of the polymerization systems in which the catalysts are employed. These substituent groups would include $C_1$ to $C_{20}$ hydrocarbon radicals, halogen radicals and $C_1$ to $C_6$ alkoxide radicals.

The π bonded chromium compounds would include the bis(cyclopentadienyl)chromium II compounds disclosed in United Kingdom Pat. 1,253,063, the allyl chromium compounds disclosed in Belgian Pat. 743,199, the bis-arene chromium compounds disclosed in U.S. 3,123,571 and U.S. 3,157,712, and the arene chromium tricarbonyl compounds disclosed in United Kingdom Pat. 1,264,393.

The bis(cyclopentadienyl)chromium[II] compounds have the structure

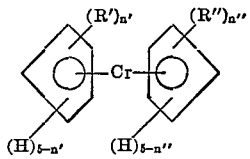

wherein R' and R" may be the same or different $C_1$ to $C_{20}$, inclusive, hydrocarbon radicals, and $n'$ and $n''$ may be the same or different integers of 0 to 5, inclusive. The R' and R" hydrocarbon radicals may be saturated or unsaturated, they may include aliphatic, alicyclic and aromatic radicals such as methyl, ethyl, propyl, butyl, pentyl cyclopentyl, cyclohexyl, allyl, phenyl and naphthyl radicals. In these compounds the chromium atoms have a valence of 2.

The π allyl chromium compounds have the structure:

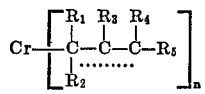

wherein $n$ is a whole number which corresponds to the valence of the chromium atom and which, in these compounds, is 2 or 3; and $R_1$ to $R_5$, inclusive, are the same or different and are H, alkyl, cycloalkyl, aryl, or aralkyl groups containing 1 to about 8, inclusive, carbon atoms.

These allyl chromium compounds thus include diallyl chromium, tris-allyl chromium, 2 - methylallyl chromium, 2-phenylallyl chroium and 1-phenylallyl chromium.

The bis arene compounds have the structure:

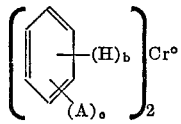

wherein $b$ is a whole number of 3 to 6, inclusive, A is an alkyl group having from 1 to about 6 carbon atoms, inclusive, $c$ is a whole number of 0 to 3, inclusive, and $b+c=6$. In these compounds the chromium atoms have a valence of 0. A non-exhaustive listing of such bis-arene compounds includes dibenzene chromium, ditoluene chromium, di-o-xylene chromium, di-p-xylene chromium, dicumene chromium, dimesitylene chromium, di(n-propylbenzene)chromium, di(1,3,5-triethylbenzene)chromium, di(1,3-diethyl - 4 - hexylbenzene)chromium, di(1,3 - dipentylbenzene)chromium, di(1,4 - dihexylbenzene)chromium, di(1,3,5-trihexylbenzene) chromium, di[1-(2-methylbutyl)benzene]chromium and the like.

The arene chromium tricarbonyl compounds have the general structure.

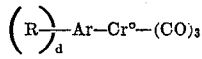

wherein Ar is selected from the group consisting of substituted or unsubstituted benzene, naphthalene, anthracene, and cycloheptatriene ring groups. The R groups are the same or different inert substituent groups, and $d$ is a whole number which represents the number of substituent sites on Ar and is 6, 8 or 10. The R groups must be inert to the components of the reaction systems in which they are made and used. Such R groups would include H, $C_1$ to $C_{14}$ alkyl, alkaryl, aralkyl, and aryl radicals, $C_1$ to $C_6$ alkoxide radicals and halogen radicals. In these compounds the chromium atoms have a valence of 0.

Examples of such tricarbonyl compounds are:

π-benzene chromium tricarbonyl
π-methylbenzenechromium tricarbonyl
π-dimethyl benzenechromium tricarbonyl
π-mesitylene chromium tricarbonyl
π-hexamethylbenzenechromium tricarbonyl
π-chlorobenzenechromium tricarbonyl
π-cumenechromium tricarbonyl
π-ethylbenzenechromium tricarbonyl
π-iodobenzenechromium tricarbonyl
π-diphenylchromium tricarbonyl
π-anthracenechromium tricarbonyl
π-naphthalenechromium tricarbonyl
π-tetrahydronaphthalenechromium tricarbonyl
π-cycloheptatrienechromium tricarbonyl
and the like.

Inorganic oxide supported organo metallic compound

The catalyst systems of the present invention are made from components which comprise an organometallic compound, the π bonded chromium compound, supported on an inorganic oxide support.

About 0.001 to 10%, or more, by weight of the organometallic compound is used on the support, based on the combined weight of the organometallic compound and the inorganic oxide support. The support thus comprises about 90 to 99.999% by weight of the composite catalyst, prior to the heat treatment thereof. The amount of the organometallic compound which can be deposited on the support varies, depending on the particular support being used, and the activation temperature of such support. Typically, about one-fourth to one-half of the amount of the organometallic compound that could be deposited on the support is used to facilitate introducing the compound into the reactors, but the extremes in amounts of from near zero to total saturation of the support have been used without adverse effect on final polymer properties.

The inorganic oxide materials which may be used as a support for the organometallic compounds are materials having a high surface area, that is, a surface area in the range of about 50 to about 1000 square meters per gram. The inorganic oxides which may be used include silica, alumina, thoria, zirconia and other comparable inorganic oxides, as well as mixtures of such oxides.

Because the organometallic compounds are sensitive to moisture, the catalyst support should be completely dried before it is brought into contact with the organometallic compound. This is normally done by simply heating or pre-drying the catalyst support with an inert gas prior to use. It has been found that the temperature of drying has an appreciable effect on the relative productivity of the catalyst system and on the molecular weight distribution and the melt index of the polymer produced.

Drying or activation of the support can be accomplished at nearly any temperature up to about its sintering temperature for a period of time which is at least sufficient to remove the adsorbed water from the support while at the same time avoiding such heating as will remove all of the chemically bound water from the support. The passage of a stream of dry inert gas through the support during the drying aids in the displacement of the water from the support. Drying temperatures of from about 200° C. to 1000° C. for a short period of about six hours or so should be sufficient if a well dried inert gas is used, and the temperature is not permitted to get so high as to completely remove the chemicaly bound hydroxyl groups on the surface of the support.

Any grade of support can be used but microspheroidal intermediate density (MSID) silica having a surface area of about 350 square meters per gram and a pore diameter of about 200 A., and intermediate density (ID) silica having a surface area of about 285 square meters per gram and a pore diameter of 168 A. are preferred. Other grades such as the G-951 silica and G-966 silica-alumina, as designated by W. R. Grace and Co. having surface areas of 700 and 500 square meters per gram, respectively, and pore diameters of 50-70 A. are also quite satisfactory. Variations in melt index control and in polymer productivity can be expected between different grades or types of supports.

The supported catalysts can be prepared by a slurry technique where the selected and properly dried support is added under conditions which exclude the presence of air and moisture to a solution containing the organochromium compound and solvent to form a slurry. The slurry may be stirred for a period of up to about four hours to obtain good adsorption of the organometallic compound on the support.

The supported catalyst can be used in slurry form, or as a semi-solid paste or as a dry free flowing powder. To form the paste or dry powder, the solvent can be filtered, drained or evaporated from the slurry under conditions which exclude oxygen and moisture to yield the desired form of the catalyst.

In some cases, dry supported catalyst may also be conveniently prepared in the absence of solvent by direct vapor deposition (sublimation) of selected organochromium compounds onto a dry support. This may be simply and conveniently accomplished by blending the organochromium compound and support under a dry, inert atmosphere, and then reducing the pressure to cause the organochromium compound to sublime and adsorb onto the support.

Thermal aging of the supported organochromium compound

After the organochromium compound is deposited on the support it is first dried to remove any solvent residues, and then it is thermally aged in accordance with the present invention. The thermal aging is conducted by heating the catalyst composition at a temperature of about 135 to 900° C., and preferably of about 300 to 700° C. for at least 0.1 hour, and preferably for about 0.5 to 3 hours. The thermal aging is conducted in an inert atmosphere. The inert atmosphere can be supplied by an inert gas such as nitrogen or argon.

The thermal aging of the composite catalyst is conducted for a period of time which is sufficient, at the selected aging temperature, to allow for the removal of at least some, and preferably all, of the organic ligands from the organochromium compounds. The ligands are thermally cleaved from the organochromium compounds during the heat treatment.

After the thermal treatment of the composite catalyst it may be further treated with about 0.001 to 10 moles, per mol of chromium in composite catalyst, of one or more organoaluminum compounds which may be a trialkyl aluminum compound, an alkyl aluminum hydride compound and/or an aluminum alkoxide compound. The use of these organoaluminum compounds helps to increase the yield of polymer that may be obtained with the thermally aged catalysts of the present invention.

The trialkyl aluminum compounds and the alkyl aluminum hydride compounds have some structural similarities. In these compounds the alkyl group is a hydrocarbyl group which can contain from 1 to about 14 carbon atoms. Illustrative of such compounds are trimethylaluminum, triethylaluminum, diethylaluminum hydride, triisobutyl aluminum, tridecylaluminum, and tridodecylaluminum. They can be generically classed as compounds of the formula:

$$(Z)_z Al(H)_y$$

wherein Z is an alkykl group as defined above, z is an integer from 1 to 3 inclusive and y is an integer from 0 to 2 inclusive, with the proviso that the sum of y and z is 3. Where these compounds contain more than one Z group, such groups may be the same or different.

The aluminum alkoxide compounds have the general formula:

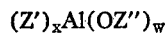

$$(Z')_x Al(OZ'')_w$$

in which x and w are each integers from 1 to 2, inclusive, and together total 3, and Z' and Z'' are the same or different hydrocarbyl groups containing from 1 to about 14 carbon atoms. Such aluminum alkoxide compounds would include diethyl aluminum methoxide, diethyl aluminum ethoxide, diethyl aluminum cyclohexane methoxide, diethyl aluminum phenoxide and methyl diethoxy aluminum.

The $C_1$ to $C_{14}$ hydrocarbyl radicals in the organoaluminum compounds would include alkyl, aralkyl, aryl, alkaryl, alicyclic, bicyclic and similar hydrocarbon groups. Examples of such groups are methyl, ethyl, propyl, isopropyl, n-butyl, isobutyl, n-pentyl, iso-pentyl, t-pentyl, hexyl, cyclohexyl, 2-methylpentyl, heptyl, octyl, 2-ethylhexyl, cyclohexylmethyl, nonyl, decyl, undecyl, dedocyl, tridecyl, tetradecyl, benzyl, pinyl, pinylmethyl, phenethyl, p-methylbenzyl, phenyl, tolyl, xylyl, naphthyl, ethylphenyl, methylnaphthyl, dimethylnaphthyl, norbornyl, norbornyl methyl or any such similar hydrocarbyl groups.

The monomers

The process of the present invention is used for the preparation of homopolymers of ethylene, and copolymers of ethylene with other alpha olefins. The alpha olefins which may be used for the preparation of copolymers in accordance with the present invention may be one or more alpha olefins containings 3 to about 8, inclusive, carbon atoms. These monomers may be mono-olefins or non-conjugated di-olefins.

The monoalpha olefins which may be copolymerized with ethylene would include propylene, butene-1, pentene-1, 3-methylbutene-1, hexene-1, 4-methylpentene-1, 3-ethylbutene-1, heptene-1, octene-1, decene-1, 4,4-dimethylpentene-1, 4,4-diethylenehexene-1, 3,4-dimethylhexene-1, 4-butyl-1-octene, 5-ethyl-1-decene, 3,3-dimethylbutene-1, and the like. Among the diolefins which may be used to form the ethylene copolymers are 1,5-hexadiene, dicyclopentadiene, ethylidene norbornene, and the like. These copolymerizable monomers may be used in any combination thereof with ethylene for the preparation of copolymers in the process of the present invention.

The polymers

The polymers which are prepared in accordance with the teachings of the present invention are solid polymers which include materials which have densities of about 0.945 to 0.970, inclusive, and melt indices of from 0 (no flow) to about 30.

The polymers are unsaturated as evidenced by positive infrared analysis for unsaturation at 10.35μ (which is indicative of internal unsaturation), 11.02μ (which is indicative of vinyl unsaturation) and at 11.26μ (which is indicative of pendant methylene unsaturation). The polymers display vinyl contents of about 0.06 to 2.0 vinyl groups per 1000 carbon atoms. The preferred polymers are homopolymers of ethylene and copolymers containing at least 50%, and preferably at least 80% by weight of ethylene and up to 50%, and preferably up to 20% by weight of one or more other mono- and/or diolefins which may be interpolymerized therewith.

The polymerization reaction

After the thermally aged catalyst has been formed, the polymerization reaction is conducted by contacting the monomer charge, and substantially in the absence of catalyst poisons, with a catalytic amount of the catalyst at a temperature and at a pressure sufficient to initiate the polymerization reaction. If desired, an inert organic solvent may be used as a diluent and to facilitate materials handling.

The polymerization reaction is carried out at temperatures of from about 30° C. or less up to about 200° C. or more, depending to a great extent on the operating pressure, the pressure of the entire monomer charge, the particular catalyst being used and its concentration. The selected operating temperature is also dependent upon the desired polymer melt index since temperature is also a factor in adjusting the molecular weight of the polymer. Preferably, the temperature is from about 30° C. to about 100° C. in the conventional slurry or "particle forming" technique and from 100° C. to 200° C. in "solution forming" operations. The control of temperature in this process is desirable as hereinafter more fully described in providing various effects upon the molecular weight of the polymers as well as in controlling the phase in which they are made. As with most catalyst systems, higher polymerization temperatures produce lower weight average molecular weight polymers, and consequently polymers of higher melt index.

The pressure can be any pressure sufficient to initiate the polymerization of the monomer charge and can be from subatmospheric pressure, using an inert gas as a diluent to superatmospheric pressure of up to about 1,000,000 p.s.i.g. (pounds per square inch gauge), or more, but the preferred pressure is from atmospheric up to about 1000 p.s.i.g. As a general rule, a pressure of 20 to 800 p.s.i.g. is most preferred.

When an inert organic solvent medium is employed in the process of this invention it should be one which is inert to all the other components and products of the reaction system and be stable at the reaction conditions being used. It is not necessary, however, that the inert organic solvent medium also serve as a solvent for the polymer produced. The inert organic solvents which may be used include saturated aliphatic hydrocarbons, such as hexane, heptane, pentane, isopentane, isooctane, purified kerosene and the like, saturated cycloaliphatic hydrocarbons, such as cyclohexane, cyclopentane, dimethylcyclopentane and methylcyclohexane and the like, aromatic hydrocarbons such as benzene, toluene, xylene, and the like and chlorinated hydrocarbons, such as chlorobenzene, tetrachloroethylene, ortho-dichlorobenzene, and the like. Particularly preferred solvent media are cyclohexane, pentane, isopentane, hexane and heptane.

When it is preferred to conduct the polymerization to a high solids level as hereinbefore set forth, it is, of course, desirable that the solvent be liquid at the reaction temperature. For example, when operating at a temperature which is lower than the solution temperature of the polymer in the solvent, the process can be essentially a slurry or suspension polymerization process in which the polymer actually precipitates out of the liquid reaction medium and in which the catalyst is suspended in a finely divided form.

This slurry system is of course dependent upon the particular solvent employed in the polymerization and its solution temperature for the polymer prepared. Consequently, in the "particle form" embodiment, it is most desirable to operate at a temperature which is lower than the normal solution temperature of the polymer in the selected solvent. For example, polyethylene prepared herein may have a solution temperature in cyclohexane of about 90° C., whereas in pentane its solution temperature may be about 110° C. It is characteristic of this "particle form" polymerization system that a high polymer solids content is possible even at low temperatures, if sufficient agitation is provided so that adequate mixing of the monomer with the polymerizing mass can be accomplished. It appears that while the polymerization rate may be slightly slower at the lower temperatures, the monomer is more soluble in the solvent medium, thus counteracting any tendency to low polymerization rates and/or low yields of polymer.

It is also characteristic of the slurry process that the monomer appears to have substantial solubility characteristics even in the solids portion of the slurry so that as long as adequate agitation is provided, and the polymerization temperature is maintained, a broad range of size of solid particles in the slurry can be provided. Experience has shown that the slurry technique can produce a system having more than a fifty percent solids content, provided conditions of sufficient agitation are maintained. It is particularly preferable to operate the slurry process in the range of 30–40 weight percent of polymer solids.

Recovery of the polymer from the solvent medium is, in this embodiment, reduced to a simple filtration and/or drying operation and no efforts need be expended in polymer clean-up and catalyst separation or purification. The residual concentration of catalyst in the polymer is so small that it can be left in the polymer.

Operating at temperatures higher than the solution temperature of the polymer in the selected solvent medium also can produce a high polymer solids content in a solution polymerization procedure. The temperature in this type of polymerization system must be sufficiently high to enable the solvent being used to dissolve at least 25–30 percent by weight of the polymer being produced. On the other hand, the temperature must be sufficiently low to avoid thermal destruction of the formed polymer and the particular catalyst employed. In general, for the various solvents and catalyst used, temperatures within the range of about 100° C. to about 200° C. and preferably about 120° C. to about 170° C. have been found to be generally optimum for the practice of such solution polymerization procedure. However, the particular polymer being produced also has a significant effect on the optimum polymerization temperature. For example, ethylene-propylene copolymers which may be produced by this process may be soluble in many of these organic solvents at relatively low temperatures even though such temperatures may not be useful for the optimum production of ethylene homopolymers.

In the present process the proportion of solvent to polymer by weight can range from 0.2 to 100 and can be as low as 0.1:1 or even less, thereby maintaining a very high catalyst productivity and efficiency of the system.

When the solvent serves as a principal reaction medium, it is, of course, desirable to maintain the solvent medium substantially anhydrous and free of any possible catalyst poisons such as moisture and oxygen, by redistilling or otherwise purifying the solvent before use in this process. Treatment with an absorbent material such as high surface area silicas, aluminas, molecular sieves and like materials are beneficial in removing trace amounts of contaminants that may reduce the polymerization rate or poison the catalyst during the polymerization reaction.

The following examples are designed to illustrate the present invention and are not intended as a limitation upon the scope thereof.

The analytical method used for determining unsaturation in the polymers produced in the examples disclosed below consisted of determining the optical density of the appropriate infrared bands and using the following equations:

$$\text{Percent vinyl unsaturation} = \frac{(A_{11.02})(7.8)}{t \text{ (mils)}}$$

$$\text{Percent trans unsaturation} = \frac{(A_{10.40\mu})(11.1)}{t \text{ (mils)}}$$

$$\text{Percent pendant methylene group} = \frac{(A_{11.27})(9.13)}{t \text{ (mils)}}$$

where:
A = absorbance
t = thickness, in mils, of a sample of polymer in film form
vinyl groups/1000 C atoms in polymer = percent vinyl × 5.19
trans unsaturation/1000 C atoms in polymer = percent trans × 5.39
pendant methylene groups/1000 C. atoms in polymer = percent pendant methylene × 5.39

Density is determined by ASTM D–1505, with the test plaque being conditioned for one hour at 120° C. to allow it to approach equilibrium crystallinity.

Melt Index (MI) is determined by ASTM D–1238, with the polymer measured at 190° C., and the test values reported as decigrams per minute.

Flow Index (HLMI) is determined by ASTM D–1238 with the measurements taken while the polymer is subjected to a weight which is 10 times that used in the Melt Index test.

$$\text{Flow Rate Ratio (FRR)} = \frac{\text{Flow Index}}{\text{Melt Index}}$$

EXAMPLES 1–5

(A) Preparation of thermally aged catalyst

To a 100 ml. round bottom flask fitted with a heating mantle, argon purge and pyrometer there were added 40 ml. of n-hexane, 0.4 gr. of silica and 20 or 30 mg. of bis-(cyclopentadienyl) chromium [II] dissolved in 0.5 ml. of toluene. The silica had a surface area of about 285 square meters per gram and had been activated at 600° C. for 18 hours. The system was stirred for about 30 minutes to allow the chromium compound to become adsorbed on the support. The flask was heated to remove the solvents and the remaining dry powder, which consisted of the organo-chromium compound adsorbed on the support, was heated at 135° C. for 30 or 60 minutes. All the operations were conducted under an inert blanket of argon gas.

After the thermal aging, the flask was cooled, 30 ml. of n-hexane was added thereto by syringe and the contents transferred, under argon, to a reactor for the desired polymerization as described below.

(B) Preparation of control catalyst

Control catalyst was prepared by depositing 10 mg. of bis-(cyclopentadienyl) chromium II on 0.4 gr. of silica. The silica had a surface area of about 285 square meters per gram and had been activated at 600° C. for about 18 hours. The adsorption of the organochromium compound on the support was accomplished in about 75–100 ml. of dry, oxygen free n-hexane in an 8 oz. bottle. The organochromium compound was supplied as a solution in toluene (~60 mg./ml.). After stirring the admixture for about 30 minutes to permit deposition of the organochromium compound on the support to take place, the contents were transferred to a reactor for the desired polymerization.

The preparation of the catalyst was conducted under an inert atmosphere of argon.

(C) Polymerization reactions

The catalysts prepared in A and B above were used in five polymerization reactions. In each reaction ethylene was homopolymerized under particle form or slurry conditions by contacting the monomer with the catalyst in 500 ml. of hexane in a one liter autoclave under argon at 90° C. and under a total pressure of 200 p.s.i.g. About 20–30 p.s.i.g. of $H_2$ was used in each reaction with the remainder of the pressure being supplied by the ethylene. The reactions were conducted for 40–60 minutes.

The catalysts used in each of these experiments, and the reaction conditions, and melt index properties of the resulting polymers are listed below in Table I.

These results indicate that even a moderate thermal aging (at 135° C.) of the catalyst produces one that has a substantial effect, i.e. lowering, of the melt index of the polymers made therewith.

All the reactions were conducted under 30 p.s.i.g. of $H_2$, except Examples 15 and 16 in which 50 p.s.i.g. of $H_2$ was used. All the reactions were conducted for 45–60 minutes except Example 16 which was conducted for 120 minutes.

The yields and melt index properties of the resulting polymers obtained in these experiments are also listed below in Table II. These results indicate that the use of higher aging temperatures, and/or the use of a more prolonged aging period, generally produces a progressively lower melt index in the resulting polymers.

TABLE II.—EXAMPLES 6-17

| Example | Catalyst | | Polymer | | | |
|---|---|---|---|---|---|---|
| | Aging temp., °C. | Aging time, min. | Yield, g. | MI, dg./min. | HLMI, dg./min. | FRR |
| 6 | 250 | 1 | 108 | 4.6 | 278 | 60 |
| 7 | 250 | 10 | 107 | 5.4 | 299 | 55 |
| 8 | 250 | 30 | 110 | 0.51 | 35 | 69 |
| 9 | 250 | 60 | 99 | 0.64 | 48 | 75 |
| 10 | 300 | 10 | 122 | 4.0 | 249 | 62 |
| 11 | 300 | 30 | 77 | 0.11 | 8.5 | 77 |
| 12 | 350 | 30 | 66 | 0.21 | 14 | 67 |
| 13 | 350 | 60 | 18 | 0.007 | 1.0 | |
| 14 | 400 | 30 | 78 | 0.01 | 1.4 | |
| 15 | 400 | 30 | 45 | 0.03 | 5.3 | |
| 16 | 400 | 30 | 122 | 0.02 | 3.1 | |
| 17 | 475 | 60 | 122 | NF | 1.1 | |

NOTE.—NF = no flow or zero MI.

EXAMPLES 18-20

(A) Preparation of thermally aged catalyst

A series of three thermally aged catalysts were prepared. Each of the catalysts was prepared by first adding 8.0 gr. of silica, 20 ml. of toluene and 0.4 gr. of bis(cyclopentadienyl)chromium [II] to a 100 ml. round bottom flask fitted with a heating mantle, argon purge and pyrometer. The silica had a surface area of about 285 square meters per gram and had been activated at 600° C. for about 18 hours. The system was stirred for about ½ hour under argon to allow the organochromium compound to deposit on the support. The admixture was then heated under argon for about ½ hour to 190° C. to remove the toluene. The resulting dry powder was then transferred

TABLE I.—EXAMPLES 1-5

| | | Aging | | | | | | |
|---|---|---|---|---|---|---|---|---|
| Example: | Mg. $(C_5H_5)_2Cr$ | Temp., °C. | Time, min. | $H_2$ p.s.i.g. | Reaction time, minutes | Yield, grams | MI | HLMI | FRR |
| 1 | 20 | 135 | 30 | 30 | 60 | 115 | 2.9 | 148 | 51 |
| 2 | 30 | 135 | 60 | 30 | 40 | 100 | 0.14 | 6.1 | 44 |
| 3 | 20 | 135 | 60 | 30 | 60 | 81 | 0.73 | 36 | 49 |
| 4 | 10 | (¹) | | 20 | 60 | 148 | 2.5 | 111 | 44 |
| 5 | 10 | (¹) | | 25 | 60 | 148 | 12 | 430 | 36 |

¹ None, control. Stored at room temperature—25° C.

EXAMPLES 6-17

(A) Preparation of thermally aged catalyst

A series of twelve thermally aged catalysts were prepared as described above in Examples 1–5A. The catalysts were prepared from bis(cyclopentadienyl)chromium [II] and 0.8 gram of an intermediate grade (56) of silica having a surface area of about 285 square meters per gram which had been activated at 600° C. for about 18 hours. The catalyst used in Example 13 was made with 20 mg. of $(C_5H_5)_2Cr$, and all the others were made with 40 mg. of this compound. Each of the catalysts was thermally aged under a different set of temperature and time conditions. The amount of organochromium compound used in each of such catalysts, and the aging conditions used therefore are listed below in Table II.

(B) Polymerization reactions

Each of the twelve catalysts prepared as described above was used to homopolymerize ethylene, by being brought into contact with the monomer in 500 ml. of n-hexane in a one liter autoclave under an argon atmosphere. The reactions were each conducted under slurry conditions at 90° C., under a total pressure of 200 p.s.i.g.

to a standard Vycor tube used for the activation or dehydration of the silica. The tube was then placed in an electrically heated furnace and the catalyst was heated at 600° C. for one hour under argon. The resulting catalyst was cooled and stored under argon until used.

(B) Polymerization reactions

Each of the three catalysts prepared as described above was used to homopolymerize ethylene by being brought into contact with the monomer in 500 ml. of n-hexane in a one liter autoclave under argon atmosphere. The reactions were each conducted under slurry conditions at 90° C. under a total pressure of 200 p.s.i.g.

The other reaction conditions, and the yields and melt index properties of the resulting polymers are listed below in Table III.

TABLE III.—EXAMPLES 18-20

| Ex. | Polymerization | | | Polymer | | | |
|---|---|---|---|---|---|---|---|
| | Time, min. | Temp., °C. | $H_2$ p.s.i.g. | Yield, grams | MI | HLMI | FRR |
| 18 | 60 | 90 | 30 | 162 | 0.01 | 2.0 | |
| 19 | 60 | 90 | 50 | 163 | 0.02 | 3.3 | |
| 20 | 30 | 132 | 30 | 61 | 3.4 | 195 | 57 |

A review of the yields of polymer obtained in Examples 1-20 indicates that the yields decrease as the aging temperature of the catalyst is increased from about room temperature to 300° C., that no significant change in yield occurs as the aging temperature is increased from about 300° to 400° C., and that the yields increase as the aging temperature is increased from 400° to at least 600° C. These results are tabulated below in Table IV.

TABLE IV

| Example | Catalyst Aging temp., °C. | Catalyst Aging time, minutes | Normalized yield, grams of polymer [1] |
|---|---|---|---|
| 4 | 25 | None | 592 |
| 1 | 135 | 30 | 230 |
| 8 | 250 | 30 | 110 |
| 11 | 300 | 30 | 77 |
| 12 | 350 | 30 | 66 |
| 14 | 400 | 30 | 78 |
| 4 | 25 | None | 592 |
| 3 | 135 | 60 | 200 |
| 9 | 250 | 60 | 99 |
| 17 | 475 | 60 | 112 |
| 18 | 600 | 60 | 163 |

[1] Yield expected from 40 mg. of $(C_5H_5)_2Cr/0.8$ g. of silica activated at 600° C. for 18 hours.

A review of the melt index properties of the polymers obtained in Examples 1-20 indicates a definite lowering of the melt index of the polymers, as the aging temperature of the catalyst is increased, as shown by data from such examples which is tabulated below in Table V. All the experiments reported in Table V were conducted at a $H_2/C_2H_4$ pressure ratio of 0.18.

TABLE V

| Example | Catalyst aging temp., °C. | Polymer MI | HLMI | FRR |
|---|---|---|---|---|
| Control | (²) | 8.3 | 362 | 44 |
| 1 | 135 | 2.9 | 148 | 51 |
| 8 | 250 | 0.51 | 35 | 69 |
| 11 | 300 | 0.11 | 8.5 | 77 |
| 12 | 350 | 0.21 | 14 | 67 |
| 14 | 400 | 0.01 | 1.4 | |
| 18 | 600 | 0.01 | 2.0 | |

[1] Conducted as in Examples 1-5 except for catalyst aging temperature.
[2] Stored at room temperature—25° C.

A review of the melt index properties of the polymers obtained in Examples 1-20 indicates that the thermally aged catalysts of the present invention do not respond to any significant degree to hydrogen as a chain transfer agent, as shown by data from such examples which is tabulated below in Table VI.

TABLE VI

| Example | Catalyst aging temp., °C. | $H_2/C_2H_4$ ratio | Polymer MI | HLMI |
|---|---|---|---|---|
| Control [1] | (²) | 0.18 | 8.3 | 362 |
| Do | (²) | 0.33 | 208 | |
| 14 | 400 | 0.18 | 0.01 | 1.4 |
| 15 | 400 | 0.33 | 0.03 | 5.3 |
| 18 | 600 | 0.18 | 0.01 | 2.0 |
| 19 | 600 | 0.33 | 0.02 | 3.3 |

[1] Conducted as in Examples 1-5 except for catalyst aging.
[2] Stored at room temperature—25° C.

Table VII below lists the percent vinyl unsaturation content, the percent trans internal unsaturation, and the percent pendant methylene group content of various of the polymers produced in Examples 1-20.

TABLE VII

| Example | Catalyst Aging temp., °C. | Catalyst Aging time, min. | MI, dg./min. | Vinyl content Wt. percent | Vinyl content Per 1,000 C | Trans internal Wt. percent | Trans internal Per 1,000 C | Pendant methylene Wt. percent | Pendant methylene Per 1,000 C |
|---|---|---|---|---|---|---|---|---|---|
| Control [1] | (²) | | 8.3 | 0.008 | 0.041 | 0.007 | 0.038 | Nil | |
| Do [1] | (²) | | 31 | 0.010 | 0.052 | 0.011 | 0.059 | 0.006 | 0.032 |
| 1 | 135 | 30 | 2.9 | 0.021 | 0.11 | 0.014 | 0.075 | 0.011 | 0.059 |
| 1* | 135 | 45 | 2.0 | 0.014 | 0.073 | 0.020 | 0.10 | 0.015 | 0.081 |
| 2 | 135 | 60 | 0.14 | 0.012 | 0.062 | 0.017 | 0.092 | 0.006 | 0.032 |
| 3 | 135 | 60 | 0.73 | 0.015 | 0.078 | 0.003 | 0.016 | 0.007 | 0.038 |
| 6 | 250 | 1 | 4.6 | 0.028 | 0.15 | 0.027 | 0.15 | 0.015 | 0.081 |
| 7 | 250 | 10 | 5.4 | 0.034 | 0.18 | 0.045 | 0.24 | 0.014 | 0.076 |
| 8 | 250 | 30 | 0.51 | 0.050 | 0.26 | 0.021 | 0.11 | 0.014 | 0.076 |
| 9 | 250 | 60 | 0.64 | 0.044 | 0.23 | 0.044 | 0.24 | 0.013 | 0.070 |
| 10 | 300 | 10 | 4.0 | 0.030 | 0.16 | 0.046 | 0.25 | 0.015 | 0.081 |
| 11 | 300 | 30 | 0.11 | 0.074 | 0.38 | 0.025 | 0.13 | 0.012 | 0.065 |
| 12 | 350 | 30 | 0.21 | 0.067 | 0.35 | 0.022 | 0.12 | 0.012 | 0.065 |
| 13 | 350 | 60 | 0.007 | 0.064 | 0.33 | (³) | | (³) | |
| 14 | 400 | 30 | 0.01 | 0.15 | 0.78 | 0.017 | 0.092 | 0.019 | 0.10 |
| 17 | 475 | 60 | NF | 0.17 | 0.88 | 0.019 | 0.10 | 0.014 | 0.075 |
| 18 | 600 | 60 | 0.03 | 0.20 | 1.04 | 0.008 | 0.043 | 0.011 | 0.059 |
| 19 | 600 | 60 | 0.02 | 0.22 | 1.14 | 0.005 | 0.027 | 0.010 | 0.054 |

[1] Conducted as in Examples 1-5 except for catalyst aging.
[2] No aging. Stored at room temperature—25° C.
[3] Difficult to measure.

NOTE.—Example 1* was conducted as in Example 1 except for the use of a 45 minute aging time.

EXAMPLES 21-27

(A) Preparation of thermally aged catalyst

A series of seven thermally aged catalysts were prepared as described above in Examples 1-5A. The catalysts were prepared from bis(cyclopentadienyl)chromium [II] and 0.8 gram of an intermediate grade (56) of silica having a surface area of about 285 square meters per gram which had been activated at 410° C. (catalyst of Example 25) or at 600° C. (catalysts of Examples 21-24 and 26-27) for about 18 hours. The catalysts was thermally aged under argon for 60 minutes at various temperatures. After the thermal aging the catalysts were cooled to room temperature and all of them, except the one used in Example 26, was treated with 0.25 millimole of triethylaluminum. The aging temperature used for each catalyst is listed below in Table VIII.

(B) Polymerization reactions

Each of the seven catalysts prepared as described above was used to homopolymerize ethylene, by being brought into contact with the monomer in 500 ml. of n-hexane in a one liter autoclave under an argon atmosphere. The reactions were each conducted under slurry conditions at 90° C., under a total pressure of 200 p.s.i.g. All the reactions were conducted under 30 p.s.i.g. of $H_2$, except Example 23 in which 50 p.s.i.g. of $H_2$ was used. All the reactions were conducted for 60 minutes.

The yields and melt index properties of the resulting polymers obtained in Examples 21–27 are also listed below in Table VIII. These results indicate that the use of the organoaluminum compound tends to provide an increase in yield without producing any adverse effects on the melt index properties of the resulting polymers.

The unsaturation content of the polymers produced in Examples 21–27 are listed below in Table IX. These results indicate that the use of the organoaluminum compound does not alter the ability of the thermally aged catalysts to produce unsaturated polymers.

TABLE VIII

| Example number | Aging temp., °C. | Yield, g. | MI, dg./min. | HLMI, dg./min. | HLMI/ MI |
|---|---|---|---|---|---|
| 21 | 250 | 90 | 1.5 | 101 | 67 |
| 22 | 350 | 117 | 2.1 | 180 | 86 |
| 23 | 350 | 59 | 3.4 | 266 | 78 |
| 24 | 350 | 85 | 0.70 | 57 | 81 |
| 25 | 350 | 75 | 0.29 | 32 | 110 |
| 26 | 350 | 18 | 0.007 | 1.0 | |
| 27 | 600 | 110 | 0.07 | 8.4 | |

TABLE IX

| | Aging temp., °C. | Vinyl | | Trans | | Pendant methylene | |
|---|---|---|---|---|---|---|---|
| | | Wt. percent | Per 1,000 C | Wt. percent | Per 1,000 C | Wt. percent | Per 1,000 C |
| Example number: | | | | | | | |
| 21 | 250 | 0.038 | 0.20 | 0.023 | 0.12 | 0.012 | 0.065 |
| 22 | 350 | 0.062 | 0.32 | 0.028 | 0.15 | 0.019 | 0.10 |
| 23 | 350 | 0.051 | 0.27 | 0.029 | 0.16 | 0.022 | 0.12 |
| 24 | 350 | 0.050 | 0.26 | 0.026 | 0.14 | 0.013 | 0.070 |
| 25 | 350 | 0.13 | 0.68 | 0.031 | 0.17 | 0.012 | 0.065 |
| 26 | 350 | 0.096 | 0.50 | (1) | | (1) | |
| 27 | 600 | 0.22 | 1.14 | 0.029 | 0.16 | 0.007 | 0.038 |

[1] Difficult to measure.

EXAMPLES 28–29

(A) Preparation of thermally aged catalyst

Two thermally aged catalysts were prepared. Each of the catalysts were preparing by depositing 80 mg. of π-benzene chromium tricarbonyl on 0.8 mg. of a silica-alumina support. The support contained about 87% by weight of $SiO_2$ and about 13% by weight of $Al_2O_3$ and had been activated at 600° C. for 18 hours. Each of the catalysts were then thermally aged at 400° C. for one hour under argon.

(B) Polymerization reactions

Each of the two catalysts prepared as described above was used to homopolymerize ethylene, by being brought into contact with the monomer in 500 ml. of n-hexane in a 1 liter autoclave under an argon atmosphere. The reactions were each conducted for one hour under slurry conditions at 90° C. The reaction of Example 28 was conducted under a pressure of 300 p.s.i.g. of ethylene and the reaction of Example 29 was conducted under 50 p.s.i.g. of $H_2$ and 250 p.s.i.g. of ethylene pressure.

The yields and the melt index, and vinyl group content of the resulting polymers are listed below in Table X. This data indicates that unsaturated polymers having low melt indexes are prepared with the thermally aged catalysts. These polymers are similar to those produced in the other examples with the other thermally aged catalysts.

TABLE X

| | Yield, grams | MI, dg./min. | HLMI, dg./min. | Vinyl groups/ 1,000 C atoms |
|---|---|---|---|---|
| Example: | | | | |
| 28 | 35 | NF | 0.05 | 1.4 |
| 29 | 28 | 0.02 | 1.9 | 1.5 |

NOTE.—NF=no flow or zero melt index.

EXAMPLES 30–34

(A) Preparation of thermally aged catalyst

A series of five thermally aged catalysts were prepared. Each catalyst was prepared by depositing 80 mg. of dicumene chromium on 0.8 gram of intermediate grade silica which had a surface area of about 285 square meters per gram and which had been activated at 600° C. for 18 hours. Each of the catalysts was then thermally aged under argon for 60 minutes, except that of Example 33 which was thermally aged under argon for 90 minutes. The aging temperature is shown below in Table XI.

TABLE XI

| Example | Aging temp., °C. | Yield, grams | HLMI, dg./min. | Methyl | | Vinyl | | Trans-internal | | Pendant methylene | |
|---|---|---|---|---|---|---|---|---|---|---|---|
| | | | | Wt. percent | Per 1,000 C | Wt. percent | Per 1,000 C | Wt. percent | Per 1,000 C | Wt. percent | Per 1,000 C |
| Control | None | 0 | | | | | | | | | |
| 30 | 150 | 53 | 1.2 | 1.09 | 10.2 | 0.52 | 2.7 | 0.08 | 0.43 | 0.05 | 0.27 |
| 31 | 200 | 36 | 1.3 | 0.99 | 9.2 | 0.41 | 2.1 | 0.07 | 0.38 | 0.04 | 0.22 |
| 32 | 300 | 73 | 0.8 | 0.41 | 3.8 | 0.27 | 1.4 | 0.03 | 0.16 | 0.03 | 0.16 |
| 33 | 400 | 98 | 0.3 | 0.23 | 2.1 | 0.15 | 0.78 | 0.01 | 0.05 | 0.01 | 0.05 |
| 34 | 400 | 68 | 1.2 | 0.36 | 3.4 | 0.24 | 1.2 | 0.02 | 0.11 | 0.01 | 0.05 |

(B) Preparation of control catalyst

A control catalyst was prepared by depositing 40 mg. of dicumene-chromium on 0.4 gram of the silica used in Examples 30–34A. The catalyst was not thermally aged, but was stored at room temperature, 25° C.

(C) Polymerization reactions

Each of the five thermally aged catalysts, and the control catalyst, prepared above were used to homopolymerize ethylene, by being brought into contact with the monomer in 500 ml. of n-hexane in a 1 liter autoclave under an argon atmosphere. The reactions were each conducted under slurry conditions at 90° C. All the reactions were run for 60 minutes, except that of Example 33, which was run for 90 minutes. All the reactions were conducted under 300 p.s.i.g. of $C_2H_4$, except that of Example 34, which was run under 30 p.s.i.g. of $H_2$ and 270 p.s.i.g. of $C_2H_4$.

The yields, high load melt indexes and unsaturation properties of the resulting polymers are also listed in Table XI. This data indicates that the polymers produced have essentially the same properties as those produced in the other examples with the other thermally aged catalysts.

The control experiment indicated that the control catalyst did not produce any measurable amount of polymer under the polymerization conditions employed.

Unless otherwise indicated in the Examples, the thermal aging of the catalysts at 135° C. was conducted in the polymerization reactor prior to the polymerization reaction, and the catalysts were prepared by depositing the chromium compound on the support from about 40 ml. of n-hexane; and the thermal aging of the catalyst at >135° C. to <600° C. was conducted in a 100 ml. round bottom flask and the catalysts were prepared by deposting the chromium compound on the support from about 40 ml. of n-hexane; and the thermal aging of the catalysts at ≥600° C. was conducted in a Vycor tube, and the catalysts were prepared by depositing the chromium compound on the support from about 20 ml. of toluene.

I claim:

1. In a process for polymerizing a monomer charge comprising ethylene by contacting said charge with a catalyst comprising at least one pi-bonded chromium compound having the structure

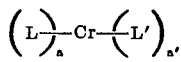

wherein L and L' are the same or different ligands adapted to being pi-bonded to said chromium atom, and $a$ and $a'$ are each integers of 0 to 3, inclusive,
with the proviso that $a+a'=2$ to 6, inclusive, and said ligands are carbonyl radicals or hydrocarbon radicals which are unsubstituted or which are substituted with inert substituents,
said compound being deposited on an activated inorganic oxide support,
the improvement which comprises heating said catalyst, prior to said contact, at a temperature of about 135 to 900° C. in an inert atmosphere for a period of time sufficient to allow for the removal of at least some of said ligands from said chromium compound.

2. A process as in claim 1 in which said support is selected from the group consisting of silica, alumina, thoria, zirconia and mixtures thereof.

3. A process as in claim 2 in which said support has a surface area of about 50 to 1,000 square meters per gram.

4. A process as in claim 3 in which said catalyst comprises 0.001 to 10% by weight of said chromium compound and 99.999 to 90% by weight of said support prior to the heating of the catalyst.

5. A process in claim 4 in which said support is silica.

6. A process as in claim 5 in which L and L' are each selected from the group consisting of carbonyl radicals and hydrocarbon radicals which are unsubstituted or substituted with inert substituents.

7. A process as in claim 6 in which L and L' are the same.

8. A process as in claim 7 in which L and L' are substituted or unsubstituted hydrocarbon radicals.

9. A process as in claim 8 in which $a+a'=2$.

10. A process as in claim 9 in which said chromium compound is a bis(cyclopentadienyl) chromium [II] compound.

11. A process as in claim 10 in which said chromium compound has the structure

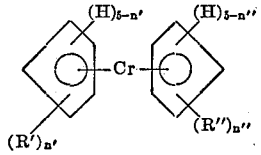

wherein $n'$ and $n''$ are each integers of 0 to 5, inclusive, and R' and R'' are each $C_1$ to $C_{20}$, inclusive, hydrocarbon radicals.

12. A process as in claim 11 in which ethylene is homopolymerized.

13. A process as in claim 12 in which $n'$ and $n''$ are each 0.

14. A process as in claim 9 in which said chromium compound is a bis arene chromium compound.

15. A process as in claim 14 in which said bis arene chromium compound has the structure

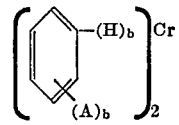

wherein $b$ is a whole number of 3 to 6, inclusive, A is an alkyl group having from 1 to about 6 carbon atoms, inclusive, $c$ is a whole number of 0 to 3, inclusive, and $b+c=6$.

16. A process as in claim 15 in which ethylene is homooplymerized.

17. A process as in claim 16 in which said bis arene chromium compound is dicumene chromium.

18. A process as in claim 6 in which said chromium compound is an arene chromium tricarbonyl compound.

19. A process as in claim 18 in which said arene chromium tricarbonyl compound has the structure

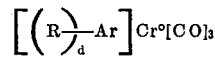

wherein Ar is selected from the group consisting of substituted or unsubstituted benzene, naphthalene, anthracene and cycloheptatriene ring groups, $d$ is a whole number which represents the number of substituent sites on Ar and is 6, 8 or 10, and the R groups are the same or different and are H, $C_1$ to $C_{14}$ alkyl, alkaryl, aralkyl or aryl radicals, $C_1$ to $C_6$ alkoxide radicals or halogen radicals.

20. A process as in claim 19 in which ethylene is homopolymerized.

21. A process as in claim 20 in which said arene chromium tricarbonyl compound is π benzene chromium tricarbonyl.

22. A process as in claim 1 which is conducted in an inert organic solvent medium.

23. A process as in claim 22 which is conducted under particle form conditions.

24. A process as in claim 1 in which said catalyst is treated with about 0.001 to 10 mols of organoaluminum compound per mol of chromium compound after the heating of the supported chromium compound, said organo aluminum compound having either the structure

wherein Z is a $C_1$ to $C_{14}$ hydrocarbyl group, $z$ is an integer from 1 to 3, inclusive, and $y$ is an integer from 0 to 2, inclusive, with the proviso that $y+z=3$,
or the structure

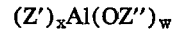

wherein Z' and Z'' are the same or different $C_1$ to $C_{14}$ hydrocarbyl groups and $x$ and $w$ are each integers of 1 or 2, with the proviso that $x+w=3$.

25. A process as in claim 24 in which said organoaluminum compound is an aluminum trialkyl compound.

26. A process as in claim 25 in which said aluminum trialkyl compound is aluminum triethyl.

27. An olefin polymerization catalyst which comprises at least one pi-bonded chromium compound having the structure

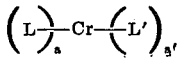

28. A catalyst as in claim 27 in which said support has a surface area of about 50 to 1000 square meters per gram.

29. A catalyst as in claim 28 in which said support is selected from the group consisting of silica, alumina, thoria, and zirconia and mixtures thereof.

30. A catalyst as in claim 29 which comprises 0.001 to 10% by weight of said chromium compound and 99.999 to 90% by weight of said support prior to the heating of said catalyst.

31. A catalyst as in claim 30 in which L and L' are each selected from the group consisting of carbonyl radicals and hydrocarbon radicals which are unsubstituted or substituted with inert substituents.

32. A catalyst as in claim 31 in which $a+a'=2$.

33. A catalyst as in claim 32 in which L and L' are the same.

34. A catalyst as in claim 33 in which L and L' are each substituted or unsubstituted cyclopentadiene radicals.

35. A catalyst as in claim 34 which is bis(cyclopentadienyl) chromium II deposited on activated silica and heated at 300 to 700° C. for 0.5 to 3 hours.

36. A catalyst as in claim 33 in which L and L' are each substituted or unsubstituted arene radicals.

37. A catalyst as in claim 36 which is dicumene chromium deposited on activated silica and heated at 300 to 700° C. for 0.5 to 3 hours.

38. A catalyst as in claim 31 in which said chromium compound is an arene chromium tricarbonyl compound.

39. A catalyst as in claim 38 which is π benzene chromium tricarbonyl deposited on activated silica and heated at 300 to 700° C. for 0.5 to 3 hours.

40. A catalyst as in claim 31 which has been treated with 0.001 to 10 mols of organoaluminum compound per mol chromium compound after heating of the supported chromium compound, said organoaluminum compound having either the structure $$(Z)_z Al(H)_y$$

wherein Z is a $C_1$ to $C_{14}$ hydrocarbyl group, z is an integer from 1 to 3, inclusive, and y is an integer from 0 to 2, inclusive, with the proviso that $y+z=3$, or the structure $$(Z')_x Al(OZ'')_w$$

wherein Z' and Z'' are the same or different $C_1$ to $C_{14}$ hydrocarbyl groups, and x and w are each integers of 1 or 2, with the proviso that $x+w=3$.

41. A catalyst as in claim 40 in which said organoaluminum compound is a trialkyl aluminum compound.

42. A catalyst as in claim 41 in which said aluminum trialkyl compound is aluminum triethyl.

References Cited
UNITED STATES PATENTS

| | | | |
|---|---|---|---|
| 3,756,998 | 9/1973 | Karapinka | 260—882. R |
| 3,757,002 | 9/1973 | Karol | 260—88.2 R |
| 3,709,853 | 1/1973 | Karapinka | 260—88.2 R |
| 3,687,920 | 8/1972 | Johnson | 260—88.2 R |
| 3,013,002 | 12/1961 | Breslow et al. | 260—88.2 R |
| 3,157,712 | 11/1964 | Walker et al. | 260—94.9 DA |
| 3,620,981 | 11/1971 | Magoon et al. | 260—24.9 DA |

JOSEPH L. SCHOFER, Primary Examiner

A. HOLLER, Assistant Examiner

U.S. Cl. X.R.

252—431 R; 260—85.3 R, 88.2 R

UNITED STATES PATENT OFFICE
CERTIFICATE OF CORRECTION

Patent No. 3,806,500            Dated April 23, 1974

Inventor(s) F. J. Karol

It is certified that error appears in the above-identified patent and that said Letters Patent are hereby corrected as shown below:

Column 2, line 69, --,-- should be inserted after "pentyl".

Column 3, line 13, "chromium", first occurrence, is misspelled.

Column 9, lines 65-67 should read --conditions. Such aging conditions are listed below in Table II.--

Column 12, line 63, "was" should read --were--.

Column 15, claim 6 should be cancelled.

Column 15, claim 7, line 1, "6" should read --5--.

Column 16, claim 15, in the structure "Cr" should read --Cr°-- and "(A)$_b$" should read --(A)$_c$--.

Column 16, claim 16, "homopolymerized" is misspelled.

Column 16, claim 18, "6" should read --5--.

Column 16, claim 27, after the structure there should be inserted

--wherein L and L' are the same or different ligands adapted to being pi-bonded to said chromium atom, and a and a' are each integers of 0 to 3, inclusive, (Continued on next page)

UNITED STATES PATENT OFFICE
CERTIFICATE OF CORRECTION

Patent No. 3,806,500      Dated April 23, 1974

Inventor(s) F. J. Karol

It is certified that error appears in the above-identified patent and that said Letters Patent are hereby corrected as shown below:

--Page 2-- with the provisos that $a + a' = 2$ to $6$, inclusive, and said ligands are carbonyl radicals or hydrocarbon radicals which are unsubstituted or which are substituted with inert substituents, said compound being deposited on an activated inorganic oxide support, and said catalyst having been heated at a temperature of about 135 to 900°C. in an inert atmosphere for a period of time sufficient to allow for the removal of at least some of said ligands from said chromium compound.--

Column 17, claim 31 should be cancelled.

Column 17, claim 32, "31" should read --30--.

Column 17, claim 38, "31" should read --30--.

Column 17, claim 40, "31" should read --30--.

Column 18, line 1 "of" should be inserted after --mol--.

Signed and sealed this 3rd day of December 1974.

(SEAL)
Attest:

McCOY M. GIBSON JR.
Attesting Officer

C. MARSHALL DANN
Commissioner of Patents